United States Patent Office 3,341,415
Patented Sept. 12, 1967

3,341,415
PHARMACEUTICAL TABLET EXCIPIENTS OF SOLID PARTICLES OF A BINARY SOLID SOLUTION OF MANNITOL WITH A SUGAR
Morton W. Scott, Livingston, N.J., assignor to Warner-Lambert Pharmaceutical Company, Morris Plains, N.J., a corporation of Delaware
No Drawing. Filed Feb. 12, 1964, Ser. No. 344,253
12 Claims. (Cl. 167—82)

This invention relates to a method for the preparation of new pharmaceutical excipients. More particularly, the present invention relates to a method for the preparation of solid solutions of mannitol with various sugars for use as a suspending agent or carrier for drug formulations, and to the resulting products. Specifically, the present invention relates to a method of preparing spray congealed binary, ternary, and quaternary solid solutions of mannitol and various sugars for use as a diluent or carrier for various drug formulations and to therapeutic tablets formed therewith.

Mannitol is a well-known hexahydric alcohol which is employed in the pharmaceutical industry as a filler for use in formulating tablets, lozenges, troches and the like primarily because of the desirable taste and for the smooth texture it imparts to the formulation. One of the difficulties experienced when including mannitol in pharmaceutical formulations is that it hinders the free flow of the formulation such as when the formulation is fed to the dies of a tablet press during the formation of tablets. This poor flow results, for the major part, as a result of the needle-like shape of mannitol crystals. Also, mannitol in the form commercially available, does not possess satisfactory compression characteristics and therefore cannot be effectively used as an excipient in concentrations normally required in the manufacture of satisfactory tablets on a production basis without recourse to involved and costly precompression operations such as granulating procedures.

Involved and time-consuming granulation procedures are usually required as well as appreciable quantities of tabletting lubricants in order to overcome difficulties encountered when mannitol is employed as a component in the manufacture of tablets. Although such expedients are of aid in producing acceptable tablets, the involved manipulative procedures greatly limit the economical reasons for using mannitol. In addition, when such processing expedients are employed, some undesirable impairment in stability of the active constituents which may be present in the tablets usually result during the commercial manufacture procedures.

It is an object of this invention, therefore, to provide a method for the preparation of a pharmaceutical excipient containing mannitol in combination with certain sugars whereby the physical characteristics of the mannitol are desirably modified and improved.

It is also an object of this invention to provide new pharmaceutical excipients formed by pulverizing a solid solution of mannitol and certain sugars.

It is another object of this invention to provide a method for the preparation of a pharmaceutical excipient from spray congealed binary, ternary, and quaternary solid solutions of mannitol with certain sugars whereby the physical characteristics of the mannitol are desirably modified and substantially improved for use as a carrier or suspending agent.

It is a further object of this invention to provide new pharmaceutical excipients formed from spray congealed solid solutions of mannitol and certain other sugars such that the flow and the compressibility characteristics of the mannitol are desirably modified and improved for use as an excipient in the preparation of tablets, capsules, lozenges, troches, and the like.

These and other objects may be realized by the practice of the present invention which generally provides a method for the preparation of new and useful pharmaceutical excipients which are formed from a molten mixture of prescribed proportions of mannitol in combination with certain sugars. The formed molten mixture is thereafter rapidly cooled, or more desirably, spray congealed to form particles having a substantially uniform composition.

In the practice of this invention, the binary, ternary, and quaternary solid solutions of mannitol may be prepared by blending in a solid solution, prescribed amounts of mannitol with various sugars, such as lactose, sucrose, erythritol, galactose, dulcitol and the like. Glycerine and the various glycols may also be incorporated with mannitol in the blends formed with these sugars.

The sugars used to form solid solutions with mannitol may be employed in any desirable proportion. However, the lower melting point mixtures are generally preferred along with those in which mannitol comprises at least about 20 percent by weight of the mixture. Usually, a combination containing the blend formed by the mixture of mannitol and various sugars may be heated under mild stirring conditions until a molten solution is formed. The molten solution of these ingredients is then removed from the heat and rapidly cooled. The cooled product, after it has been reduced to the desired particle size, may be combined with added active ingredients, as desired, and thereafter formed into tablets, capsules, and the like. Alternately, the active ingredients may be combined with the mannitol blend in the molten state and the mixture thereafter rapidly cooled and processed into tablets or any other convenient form suitable for consumption.

The binary, ternary, and quaternary mixtures of mannitol, as prepared herein, may be rapidly cooled, such as for example, by allowing a molten solution thereof to flow onto a cool plate which is maintained at a temperature well below the solidifying temperature of the mannitol solution. The preferred particle size of the solid solution of mannitol formed by this procedure for use in tabletting procedures is generally about 12 to about 60 mesh (U.S. Sieve).

More desirably, however, the binary, ternary, and quaternary mixtures of mannitol, as prepared herein, may be spray congealed by feeding the molten mixture to an atomizing device such as a pressure nozzle or centrifugal wheel atomizer to break the molten mixture into small particles which are rapidly cooled in a dry inert substantially gaseous atmosphere such as air, nitrogen, helium, and the like, which congeals the mannitol mixture without any material degree of reaction therewith.

The temperature of the dry-gaseous atmosphere employed may be at any desirable temperature such as, for example, from about −10° C. to about 80° C., although higher and lower temperatures may be employed. Upon contact with the gases of the inert atmosphere the finely divided molten mannitol mixture forms substantially the dry and free-flowing particles consisting of a solid solution of mannitol with the various sugars employed. The formed particles may then be combined with various additives usually employed in tablet compositions.

When the molten mannitol solution is spray congealed by being fed to a 5.0 cm. diameter centrifugal atomizer wheel rotating at a speed of from 15,000 to 40,000 r.p.m., the resulting particles are found to have an average particle size of about 15 to about 300 microns in diameter. Larger particles can be conveniently prepared in average sizes up to about 2,000 microns in diameter by using a larger diameter atomizer wheel operating at lower speeds. These particles of the spray congealed mixtures are particularly valuable as they permit compositions formed therewith to flow freely such as to the feed of a tablet press or filling machine.

Since the melting point or the congealing point of the solid mannitol solutions prepared herein are relatively high compared to room temperature, the molten mannitol solutions will congeal rapidly upon coming in contact with a cold surface where the temperature of the melt drops below the congealing temperatures. Therefore, in order to prevent any build-up of the solid mannitol solution on the apparatus prior to atomizing, the various parts of the apparatus which contact the molten mannitol solution and precede the atomizing device must be controllably heated either electrically or by controlled circulating hot air. The use of temperature substantially above the congealing point of the mannitol solution are undesirable as such temperatures may have a detrimental effect upon any of the constitutents added to the molten mannitol solution.

Pharmaceutical agents may be combined directly with the molten binary, ternary, and quaternary mannitol solutions. However, because many pharmaceutical agents are heat sensitive, there is added advantage in using the solid solutions of a mannitol of lower melting points. Medicaments which are immiscible in the molten mannitol blend and which do not decompose therein are particularly useful and include materials such as magnesium trisilicate, calcium carbonate and aluminum hydroxide and the like. Medicaments which are miscible in the molten mannitol solutions and which do not decompose therein are also useful and include materials such as p-hydroxy acetanilide, barbital, phenobarbital, amobarbital, phenobarbital sodium diphenhydramine, procaine hydrochloride, metycaine, phenylephrine hydrochloride, sulfanilamide, sulfacetamide, and the like. Thereafter, the solutions may be spray congealed to form small particles of a substantially uniform composition which may be readily compressed into tablet form. As an alternate procedure, the pharmaceutical excipients containing mannitol may be cooled on an ointment mill and then broken up to form smaller sized particles. Various heat sensitive therapeutic agents may then be added to the mannitol solid solutions prior to forming tablets, capsules and the like.

The following examples are included further to illustrate this invention.

*Example 1*

Twenty grams of mannitol are melted in an electrically heated laboratory mixer and 20 grams of sucrose are gradually added to the molten mannitol with continuous mixing. When the mannitol and sucrose are blended, the blend is removed from the mixer and cooled to form a solid solution of sucrose and mannitol which has a melting point of about 150° C. The congealed mass is then passed through a micropulverizer, wherein non-spherical particles are formed. One gram of magnesium stearate is blended with the pulverized mass and the final product has an average particle size of about 12 to about 60 mesh. (U.S. Sieve)

A second mixture is made by melting 20 grams of mannitol in an electrically jacketed laboratory mixer to which 20 grams of sucrose are added. The liquid mannitol sucrose mixture is then spray congealed by employing a rotating wheel atomizer of 5.0 cm. diameter operating at about 35,000 r.p.m. and by directing the spray into a flowing stream of air maintained with an inlet temperature of 25° C. The particles formed are found to be substantially uniform with an average particle size of from about 50 to about 260 microns in diameter.

For comparison, a third test sample is prepared by mixing twenty grams of powdered sucrose with an equal amount by weight of powdered mannitol and then thoroughly blending one gram of magnesium stearate in this blend of powdered mannitol and sucrose. The powdered mannitol and sucrose employed have a particle size of 50 to 200 microns.

When the sample formed by blending equal amounts of powdered sucrose and powdered mannitol and then adding magnesium stearate (third test sample) is compressed in a Stokes "E" single punch press using 12/32" standard concave punches, the mixture is observed to have poor flow properties as compared to the particles formed of the solid solutions of the first and second test sample. Further, the sucrose-mannitol mixed powder exhibits poor compressibility with sticking and binding occurring in the mold when tablets with a hardness of 8 Strong-Cobb units were desired. The particles of sucrose-mannitol solid solution prepared in the first are observed to have good flow properties and exhibited good compressibility up to about 10 Strong-Cobb units without excessive sticking and binding occurring in the mold.

The spray congealed particles of the sucrose-mannitol solid solution are observed to have excellent flow properities and exhibit excellent tablet compressibility up to 12 Strong-Cobb units without sticking, capping, or binding occurring in the mold.

*Example 2*

Thirty grams of mannitol are melted in an electrically heated mixer and seventy grams of dulcitol are then gradually added to the molten mannitol with continuous mixing. When the mannitol and dulcitol are thoroughly blended, the blend is removed from the mixer, cooled, and the cooled mass then passed through a micropulverizer wherein particles having an average particle size of about 12 mesh (U.S. Sieve) are produced. The powder obtained melts at a temperature 156°–158° C. One gram of magnesium stearate is added and then blended into the micropulverized mass. Tablets are formed from this blend by the tabletting procedure of Example 1. The lubricating particles of the mannitol-dulcitol solid solution exhibit excellent flow properties. The tablets are formed without capping, sticking or binding and may be produced in a range up to 10 Strong-Cobb units.

*Example 3*

The procedure of Example 2 is repeated using a blend of 80 grams of erythritol with 20 grams of mannitol. This combination is found to produce a blend melting at 114–118° C. Tablets which are formed on using this mixture reduced to a particle size of about 12 mesh (U.S. Sieve) and the tabletting procedure of Example 1 are found to have good flow characteristics with excellent compressibility up to 10 Strong-Cobb hardness units.

*Example 4*

The procedure of Example 2 is repeated using a blend of 20 grams of lactose with 80 grams of mannitol. This weight combination is found to melt at about 162° C. The molten solution is spray-congealed by the atomizing and cooling procedures employed in Example 1. Tablets formed using the above solid solution in particles of 50 to 260 microns in diameter in the tabletting procedure of Example 1 are satisfactory and the blend is found to have good flow characteristics with excellent compressibility to form tablets of up to 10 Strong-Cobb hardness units.

*Example 5*

The procedure of Example 2 is repeated using 20 grams of galactose and 80 grams of mannitol. This weight combination is found to melt at about 156° C. Tablets formed using this mixture and the tabletting procedure of Example 1 are found to have good flow characteristics with excellent compressibility up to 10 Strong-Cobb hardness units.

*Example 6*

Eighty grams of mannitol are melted in an electrically heated mixer and maintained slightly above the melting point of mannitol or about 167° F. Eighty grams of sucrose are dissolved in the molten mannitol along with 40 grams of magnesium trisilicate. This molten solution is thereafter spray congealed into an atmosphere of cool dry air maintained at 30° C. employing a rotating wheel atomizer. The particles, having an average size of 50 to about 260 microns in diameter, are combined with 4 grams of calcium stearate and tablets are formed of the mixture on a standard rotating tablet press.

The spray congealed mixture is found to have substantially improved flow characteristics over equivalent dry mixtures obtained by blending finely divided mannitol, sucrose, and magnesium trisilicate of equivalent particle size. The flow characteristics are found to be far superior to a dry mixture containing only mannitol and phenobartital. The tablets formed with this spray congealed mixture are found to exhibit excellent compressibility characteristics without capping, sticking or binding.

*Example 7*

The procedure of Example 4 is repeated using 20 grams of sulfanilamide in a molten mixture of 30 grams of mannitol and 70 grams of dulcitol. The molten mixture is spray congealed following the procedure described in Example 4. About 0.6 gram of calcium stearate is added to and blended with the spray congealed particles. Tablets are readily formed in a standard tablet press with no apparent capping or chipping, nor are the tablets friable. These tablets formed are found to have a disintegration time of about 50 minutes when there is no disintegrant added.

*Example 8*

The procedure of Example 4 is repeated using 20 grams of mannitol and 80 grams of erythritol. When the solution is molten, 20 grams of dicyclomine hydrochloride are added and the solution is spray congealed to form particles of an average particle size of about 50 to about 260 microns in diameter which are then combined with 2.5 grams of calcium stearate and sodium diphenhydramine. Tablets are formed in a standard tablet forming machine. There is no apparent capping, sticking, or binding. Tablets similarly processed containing powdered mannitol and sodium diphenhydramine are found to stick in the press even at substantially lower pressure than those used to form tablets by the present example.

*Example 9*

A ternary mixture is formed by melting 60 grams of mannitol and then adding 20 grams of sucrose and 30 grams of lactose to the melt. Twenty grams of aluminum hydroxide are blended with the molten mixture which is thereafter spray congealed. The particles formed are found to have a particle size of 50 to 260 microns in diameter. About 1½ grams of calcium stearate are blended with the particles of the spray congealed ternary mixture. This blend exhibits excellent flow characteristics when fed to a standard press and the tablets formed show no substantial capping, sticking, or binding in the cavities.

Although the binary and ternary mixture of mannitol are specifically described herein for use as pharmaceutical tabletting excipients, these mixtures may also be used in the preparation of confections, powdered concentrates and the like. Other uses will also become apparent such as those wherein mannitol sugars are customarily employed.

Magnesium stearate, calcium stearate, sodium stearate, stearic acid, talc, and the like lubricants may be usefully employed to facilitate tabletting of compositions containing the pharmaceutical excipients as prepared herein.

If desired, other additives such as fillers, stabilizers, coloring and flavoring ingredients may also be combined with the described pharmaceutical excipients to impart any desired added characteristics to the formed tablets.

It is to be understood that the foregoing detailed description is given merely by way of illustration and that many variations may be made therein without departing from the spirit of the present invention.

What is claimed is:

1. In a method of forming a tabletting excipient containing mannitol as an essential ingredient for use in compression tabletting, the improvement which consists essentially of forming solid particles of a binary solid solution of mannitol with a sugar.

2. In a method of forming a tabletting excipient containing mannitol as an essential ingredient for use in compression tabletting, the improvement which consists essentially of atomizing a molten solution of mannitol and a sugar in the form of finely divided droplets into a stream of an inert gas and congealing the droplets to form finely divided particles having nearly spherical particle shape.

3. In a method of forming a tablet excipient containing mannitol as an essential ingredient for use in compression tabletting, the improvement which consists essentially of forming solid particles of a binary solid solution of mannitol with a sugar, said particles having an average particle size or from about 15 microns in diameter to about 2,000 microns in diameter and formed by spray congealing a molten solution of mannitol with a sugar in the form of finely divided particles into a stream of inert gases.

4. In a method of forming a tabletting excipient containing mannitol as an essential ingredient for use in compression tabletting, the improvement which consists essentially of forming solid particles of a binary solution of mannitol with a sugar selected from the group consisting of lactose, sucrose, erythritol, galactose, and dulcitol.

5. In a method of forming a tabletting excipient containing mannitol as an essential ingredient for use in compression tabletting, the improvement which consists essentially of forming solid particles of a ternary solid solution of mannitol and a sugar selected from the group consisting of sucrose, dulcitol, erythritol, lactose, and galactose.

6. In a method of forming a tabletting excipient containing mannitol as an essential ingredient for use in compression tabletting, the improvement which consists essentially of forming solid particles of a quaternary solid solution of mannitol and a sugar selected from the group consisting of sucrose, dulcitol, erythritol, lactose and galactose.

7. A method for the preparation of new improved therapeutic tablets which comprises heating a mixture of mannitol and sucrose to a molten solution, blending a medicament therein, spray congealing the mixture to form compressible granules and compressing said granules into a tablet.

8. A method for the preparation of new improved therapeutic tablets which comprises, heating a mixture of mannitol and erythritol to a molten solution, blending a medicament therein, spray congealing the mixture to form compressible granules and compressing said granules into a tablet.

9. A method for the preparation of new improved therapeutic tablets which comprises, heating a mixture of mannitol and lactose to a molten solution, blending a medicament therein, spray congealing the mixture to form compressible granules and compressing said granules into a tablet.

10. A method for the preparation of new improved therapeutic tablets which comprises, heating a mixture of mannitol and galactose to a molten solution, blending a medicament therein, spray congealing the mixture to form compressible granules and compressing said granules into a tablet.

11. A method for the preparation of new improved therapeutic tablets which comprises, heating a mixture of mannitol and dulcitol to a molten solution, blending a medicament therein, spray congealing the mixture to form compressible granules and compressing said granules into a tablet.

12. A method for the preparation of new improved therapeutic tablets which comprises, heating a mixture of mannitol, sucrose, and lactose to a molten solution, blending a medicament therein, spray congealing the mixture to form compressible granules and compressing said granules into a tablet.

References Cited

UNITED STATES PATENTS 3,084,104  4/1963  Tuerck et al. ———————— 167—82
3,145,146  8/1964  Lieberman et al. ——————— 167—82

LEWIS GOTTS, *Primary Examiner*.

S. K. ROSE, *Assistant Examiner*.